United States Patent
Fillman et al.

[11] Patent Number: 5,934,053
[45] Date of Patent: Aug. 10, 1999

[54] REMOVABLE BATTERY TRAY SYSTEM FOR AN ELECTRICALLY POWERED MOWER

[76] Inventors: Alan R. Fillman, 5622 Riviera Dr., Racine, Wis. 53406; Timothy A. Esser, 1925 8th Pl., Kenosha, Wis. 54601

[21] Appl. No.: 08/740,774

[22] Filed: Nov. 1, 1996

[51] Int. Cl.[6] .................................................. A01D 69/00
[52] U.S. Cl. ............................................. 56/11.9; 56/16.7
[58] Field of Search ............................... 56/11.9, 10.2 R, 56/10.8, 16.7, 16.9, 12.1, 12.7, 255, 295, DIG. 17, DIG. 20; 30/276; 280/DIG. 5; 180/65.1, 68.5; 187/222

[56] References Cited

U.S. PATENT DOCUMENTS

| | | |
|---|---|---|
| 2,057,417 | 10/1936 | Clapper . |
| 2,417,613 | 3/1947 | Radabaugh . |
| 2,597,735 | 5/1952 | Jepson . |
| 3,212,244 | 10/1965 | Wilgus .................................. 56/11.9 X |
| 3,410,063 | 11/1968 | Speiser . |
| 3,425,197 | 2/1969 | Kita . |
| 3,429,110 | 2/1969 | Strasel . |
| 3,511,033 | 5/1970 | Strasel . |
| 3,511,034 | 5/1970 | Strasel . |
| 3,613,337 | 10/1971 | Akgulian et al. . |
| 3,631,659 | 1/1972 | Horowitz . |
| 3,729,912 | 5/1973 | Weber . |
| 3,732,671 | 5/1973 | Allen et al. . |
| 3,821,997 | 7/1974 | Sieren ...................................... 180/68.5 |
| 3,841,069 | 10/1974 | Weck . |
| 3,924,389 | 12/1975 | Kita . |
| 4,021,996 | 5/1977 | Bartlett et al. . |
| 4,024,448 | 5/1977 | Christianson et al. . |
| 4,042,055 | 8/1977 | Ward ..................................... 180/65.1 X |
| 4,145,864 | 3/1979 | Brewster, Jr. . |
| 4,306,402 | 12/1981 | Whimp . |
| 4,511,304 | 4/1985 | Woodruff ............................. 403/317 X |
| 4,680,922 | 7/1987 | Arnold . |
| 4,685,280 | 8/1987 | Lloyd et al. . |
| 4,686,445 | 8/1987 | Phillips . |
| 4,718,286 | 1/1988 | Eller . |
| 4,878,338 | 11/1989 | Aldred et al. . |
| 4,947,630 | 8/1990 | Rich et al. . |
| 4,995,227 | 2/1991 | Foster . |
| 5,007,234 | 4/1991 | Shurman et al. . |
| 5,140,249 | 8/1992 | Linder et al. . |
| 5,156,226 | 10/1992 | Boyer et al. ........................... 180/65.1 |

(List continued on next page.)

FOREIGN PATENT DOCUMENTS

| | | | |
|---|---|---|---|
| B-84961/91 | 10/1994 | Australia . | |
| 25 45 629 | 4/1977 | Germany ................................ 56/11.9 |
| WO 93/1264 | 7/1993 | WIPO . | |

OTHER PUBLICATIONS

MTC (Materials Transportation Company) Battery Handling Equipment Catalog, pp. 10–14—Aug., 1994.

Photograph of battery tray of Ransomes, Inc. taken by an employee of the assignee of this application in Holland, The Netherlands, at a trade show called Demo–Dagen '95, Sep. 12–14, 1995.

Owner's Manual and Parts List for Jacobsen 22" Electric Putting Green Mower, Model 110, Ser. No. 1601–Up, pp. 1–15.

Toro Brochure entitled "What mower gives greens the kindest cut of all?" dated Feb. 1994.

Jacobsen Brochure for Tri–King™ Triplex Mowers dated 1992.

Ransomes Brochure.

*Primary Examiner*—Anthony Knight
*Assistant Examiner*—Gary Grafel

[57] ABSTRACT

A removable battery tray for an electric mower is disclosed. The battery tray fits over the frame of the mower during operation, and can be removed by a hoist or other method in order for the electric mower to continue to operate with another charged set of batteries. The battery tray also has a central power plug that is used for charging and is the only electrical disconnect required when changing the battery tray.

18 Claims, 8 Drawing Sheets

U.S. PATENT DOCUMENTS

| | | |
|---|---|---|
| 5,204,814 | 4/1993 | Noonan et al. . |
| 5,261,213 | 11/1993 | Humphrey . |
| 5,301,494 | 4/1994 | Peot et al. . |
| 5,406,778 | 4/1995 | Lamb et al. . |
| 5,417,193 | 5/1995 | Fillman et al. . |
| 5,501,289 | 3/1996 | Nishikawa et al. ............... 180/65.1 X |
| 5,502,957 | 4/1996 | Robertson . |
| 5,513,721 | 5/1996 | Ogawa et al. ..................... 180/68.5 X |
| 5,540,037 | 7/1996 | Lamb et al. . |
| 5,552,240 | 9/1996 | Derstine . |
| 5,553,445 | 9/1996 | Lamb et al. . |
| 5,606,851 | 3/1997 | Bruener et al. . |
| 5,619,845 | 4/1997 | Bruener et al. . |
| 5,819,513 | 10/1998 | Braun et al. . |

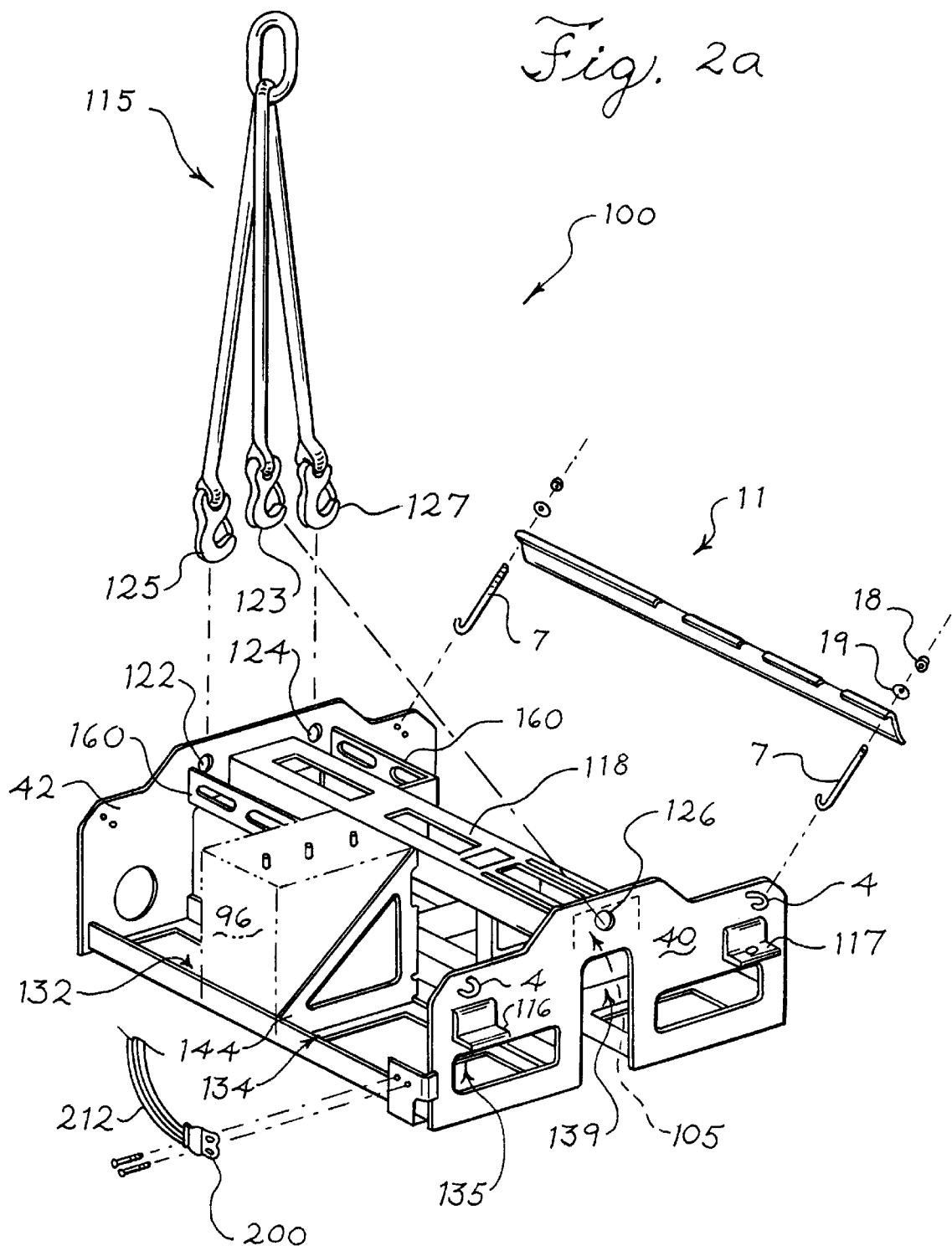

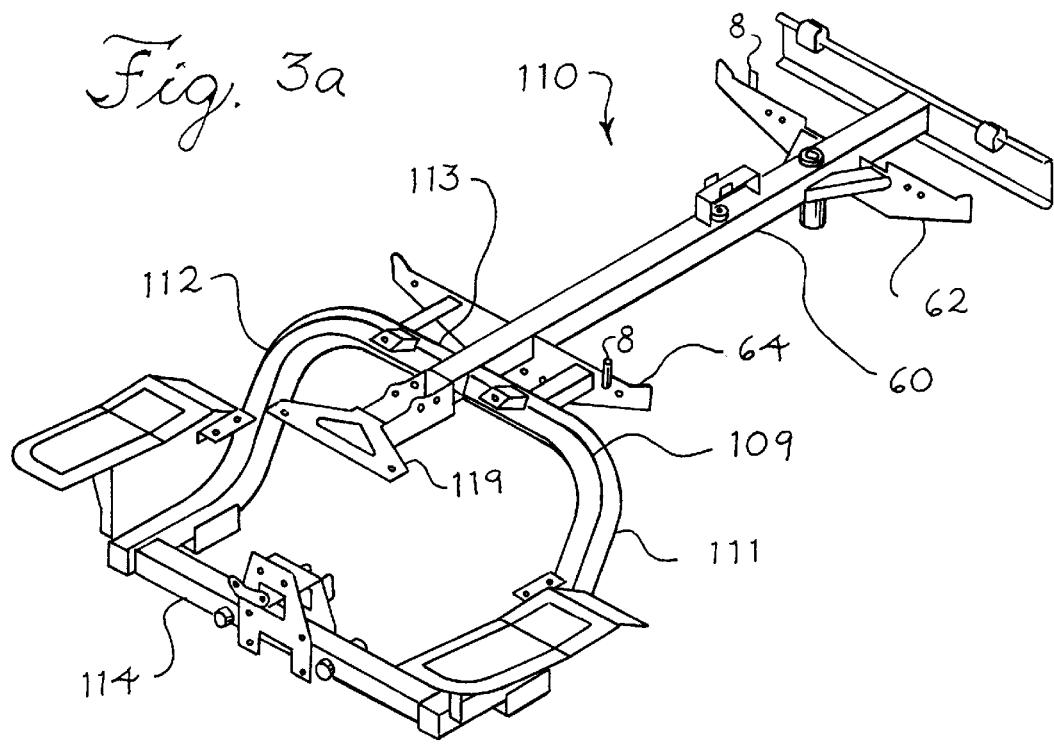

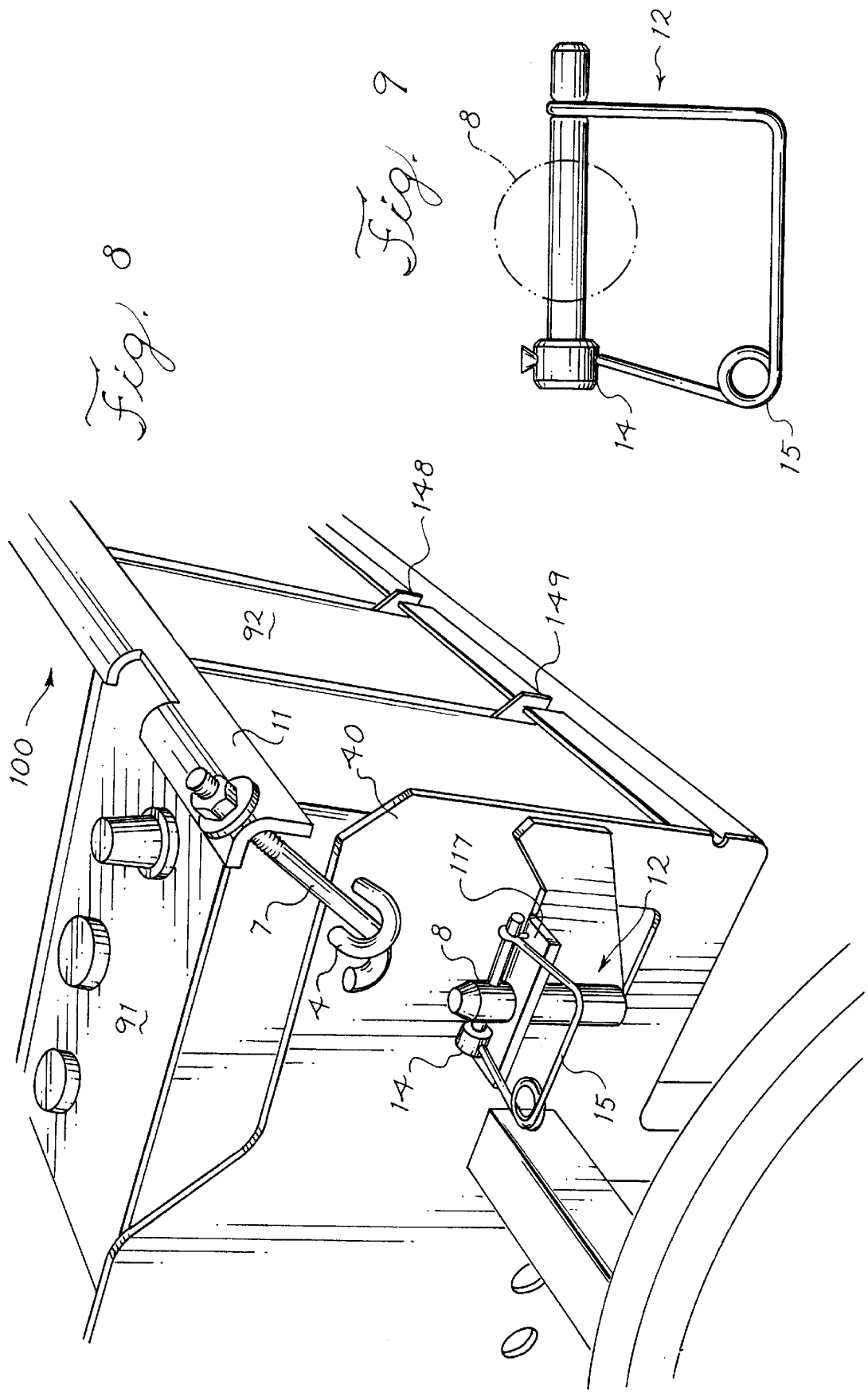

स,९३४,०५३

REMOVABLE BATTERY TRAY SYSTEM FOR AN ELECTRICALLY POWERED MOWER

BACKGROUND OF THE INVENTION

1. Field of the Invention

This invention relates in general to electrically powered vehicles and relates specifically to an electrically powered mower with a removable, rechargeable battery tray system.

2. Prior Art

One application for the present invention is in electrically powered mowers that are used on golf courses, particularly for mowing the greens. Conventional electrically powered greens mowers utilize eight 6-volt lead-acid deep cycle batteries. Generally, one battery set of eight 6-volt batteries powers the mower for about three to five hours, or around fifteen to thirty greens. Once the battery set has discharged, if more mowing is required, the operator must either recharge the battery set, which may take eight to twelve hours, or replace the battery set with a fully charged, alternate battery set. The batteries in the battery set are anchored to the mower frame with metal or plastic hold-down brackets. To remove the batteries, the hold-down brackets as well as wiring to each battery must be removed. The process of exchanging the batteries is time consuming and is not conducive to efficiently mowing an entire golf course.

SUMMARY OF THE INVENTION

A removable battery tray system has been developed for an electrically powered mower.

The system incorporates a removable battery tray that houses a battery set and a detachable plug used for charging the battery set. When the battery set becomes discharged, the operator drives to a designated area, removes the battery tray containing the discharged battery set from the mower, replaces the tray with another tray housing a fully charged set of batteries and is ready to operate again.

One object of the present invention, therefore, is to allow for increased range of the mower when operating on golf course greens and tees.

Another object of the present invention is to provide an easily removable, exchangeable tray for the electric mower battery set so that when discharged, the entire battery set can be quickly and efficiently replaced with a charged battery set in another tray.

A further object of the present invention is to provide a single, detachable plug for the battery set so that all of the batteries can be easily recharged without needing to independently connect and charge each separate battery.

These and other objects, features, and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2a is a perspective view of a first embodiment of the removable battery tray;

FIG. 3a is a perspective view of a first embodiment of a mower frame in accordance with the present invention;

FIG. 3b is a perspective view of a second embodiment of a mower frame in accordance with the present invention;

FIG. 5a shows a first embodiment of the removable battery tray along line A—A of FIG. 4a;

FIG. 6a shows a first embodiment of the removable battery tray along line B—B of FIG. 4a;

FIG. 8 is a view of a spring lock system in operation on the removable battery tray of the present invention; and FIG. 9 is a close up view from above of the spring pin and spring lock that may be used in accordance with the present invention.

DETAILED DESCRIPTION OF THE PREFERRED EMBODIMENTS

Figure 1:
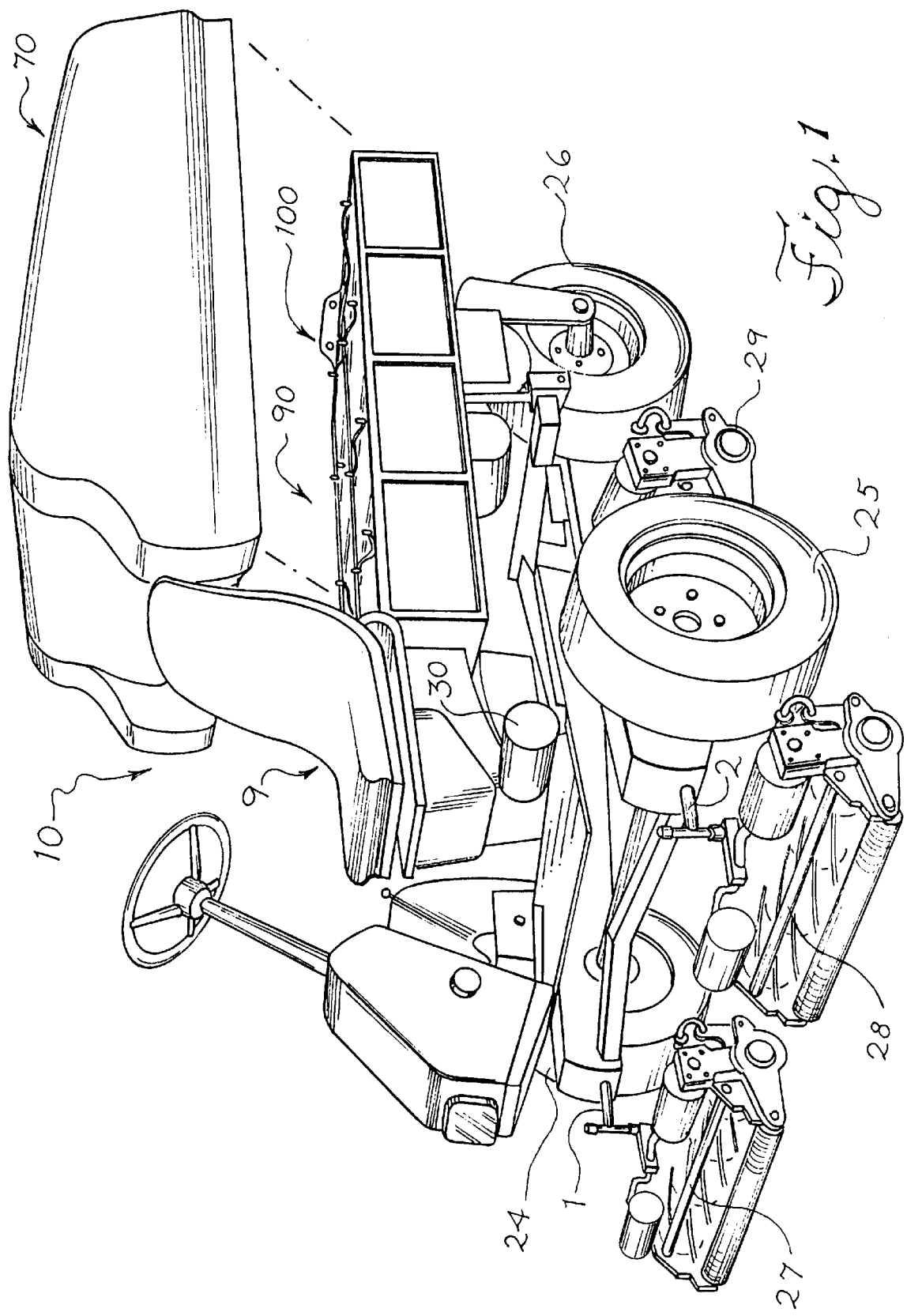
FIG. 1 shows a general illustration of an electric mower in accordance with the present invention with the battery tray cover removed.

In the Figures, a removable battery tray 100 is provided for an electric mower 10. FIG. 1 is a general illustration of the mower 10 utilizing the present invention. In the embodiment shown in FIG. 1, the riding greens mower 10 of the present invention includes three wheels 24, 25, and 26. Two front drive wheels 24 and 25 are powered by electric drive motor 30. The rear wheel 26 is positioned behind and between the two front drive wheels 24 and 26 and is pivotable to steer the mower 10. The cutting units 27, 28, and 29 are positioned ahead of each of the wheels 24, 25, and 26 respectively. Ideally, the cutting units are reel cutting units, but can also be rotary cutting units, or other types of cutting units. The cutting units 27, 28, and 29 are mounted on lift arms 1, 2 and 3. The operator selectively raises and lowers the lift arms 1, 2 and/or 3 depending on which cutting unit 27, 28, and/or 29, the operator wishes to use. When in the lowered or operative position, the lifts arms 1, 2 and 3 allow free vertical motion of the cutting units 27, 28, and 29 producing an even cut over an undulating surface such as an uneven golf course green. The electric drive motor 30 is powered by a battery set 90. Ideally, more than one battery is provided in the battery set 90 to deliver optimum power to the electric mower. On small units, however, a single battery constituting the battery set 90 is possible. The batteries in the set 90 are located in the battery tray 100 shown in FIG. 1 with battery tray hood 70 removed.

Two embodiments of the removable battery tray 100 will now be disclosed. One skilled in the art will recognize that individual features of one embodiment can be interchanged with features of the other embodiment, thus providing for a multitude of embodiments while still remaining within the scope of the present invention.

The first embodiment of the removable battery tray 100 is shown in detail in FIG. 2a. The removable battery tray 100 holds the battery set 90 with individual batteries 91, 92, 93, 94, 95, 96, 97, and 98. Battery 96 is shown in phantom in the removable battery tray 100. The removable battery tray 100 allows for easy removal of a discharged battery set 90, and easy installation of another tray 100 containing a charged battery set 90.

The removable battery tray 100 has a front frame member 40 and a rear frame member 42. The removable battery tray 100 has, mounted between both the front frame member 40 and the rear frame member 42, a longitudinal support beam 118 with a cross section in the shape of an upside down "U" 105, shown in phantom in FIG. 2a. The longitudinal support beam 118 is attached at its front end to the inside center of the front frame member 40 and at its rear end to the inside center of the rear frame member 42. The cross sectional shape of the longitudinal support beam 118 assists in securing the removable battery tray 100 to the mower frame 110 (FIGS. 1 and 3a) as will be discussed in more detail below.

Both the front frame member 40 and the rear frame member 42 have a frame support bracket 116 and a frame support bracket with a hole 117 that protrude from their external side. Only front frame support bracket 116 and front frame support bracket with a hole 117 are shown in FIG. 2a. Rear frame member 42 has frame support brackets 116 and 117 protruding on its external side in the same manner. When the removable battery tray 100 is placed on the mower frame 110, the frame support brackets 116 and 117 located on both the front frame member 40 and the rear frame member 42 provide stability for the removable battery tray 100 as will be described in more detail later.

The removable battery tray 100 has openings 122, 124 and 126 to aid in removal of the battery tray 100 from the mower frame 110. Opening 126 is located on front frame member 40 in the upper center, and openings 122 and 124 are symmetrically positioned in the rear frame member 42. Hooks 123, 125 and 127 on hoist 115 can be attached the holes 122, 124, and 126 respectively to allow easy removal of a battery tray 100 containing a used battery set 90 and installation of a second battery tray 100 containing a charged battery set 90. The openings 122, 124 and 126 along with the hooks 123, 125, and 127 comprise a means for removing the battery tray 100 from the mower frame 110 and a means for positioning the battery tray 100 on the mower frame 110. One skilled in the art will recognize, however, that there are many other equivalent means for removing and means for positioning while still remaining within the scope of the invention.

Each battery 91–98 rests in the removable battery tray 100 on support bars 132, 134, 135, 136, 138, and 139 each extending approximately half way across the removable battery tray 100 from the outside edge of the frame toward the support beam 118. The support bars may be gussets, struts, beams or together may form one integral bottom battery support member 170 (see FIGS. 4a, 4b). These support bars 132, 134, 135, 136, 138, rest and help to hold the batteries 91–98 in place in the removable battery tray 100. The support bars 132, 134, 135, 136, 138, and 139 also provide for an open, removable battery tray 100, allowing for easy debris removal. As a result it is not necessary to include a solid bottom for the removable battery tray 100. This allows for a lighter, removable battery tray 100, and therefore, easier removal of the battery tray 100 from the mower 10.

Figure 2B:
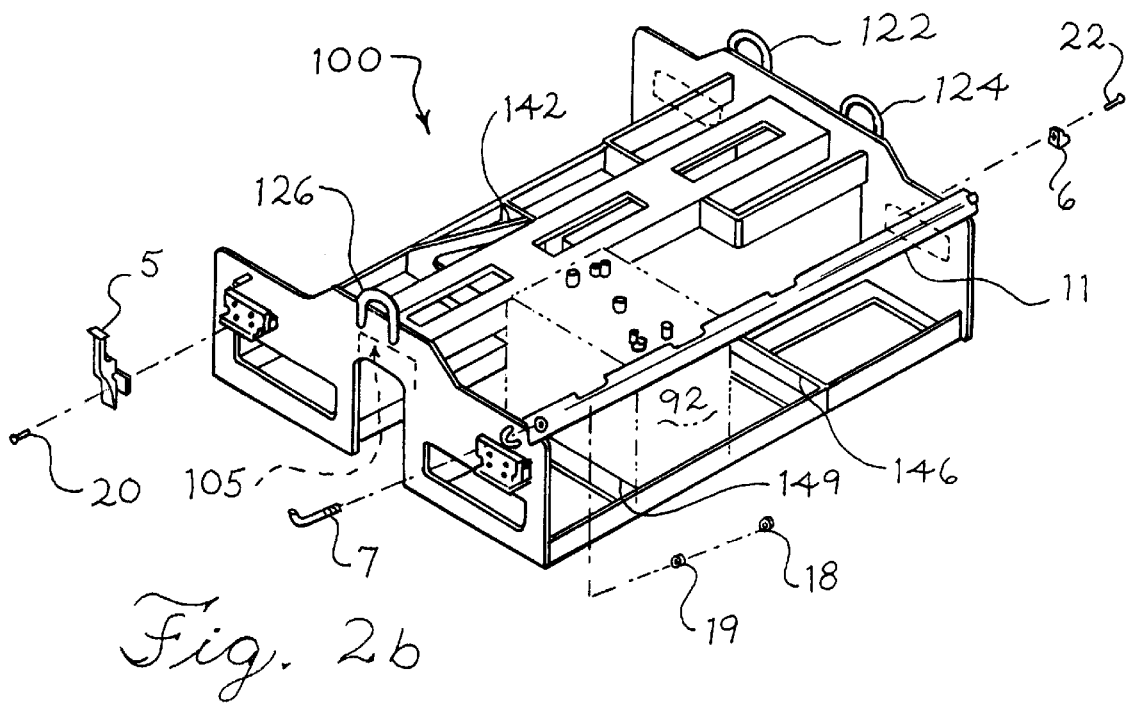
FIG. 2b is a perspective view of a second embodiment of the removable battery tray.
Figure 6A:
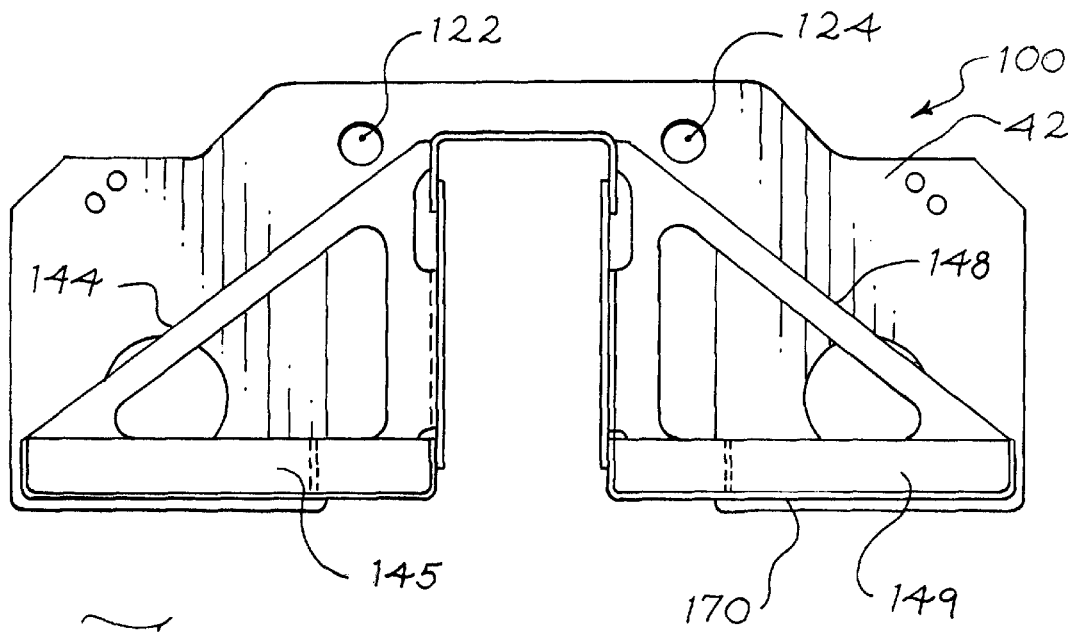
Figure 6B:
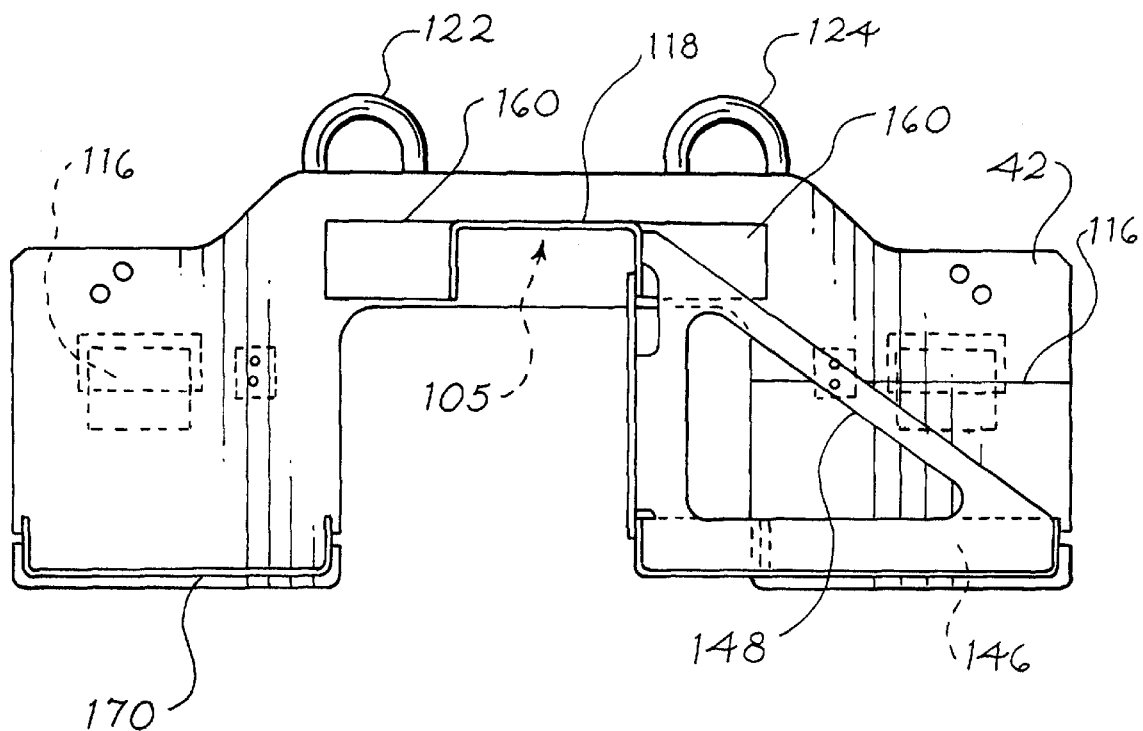
FIG. 6b shows a second embodiment of the removable battery tray along line B—B of FIG. 4b.

The removable battery tray 100 also has dividers 142, 144, 145, 146, 148, and 149 secured to respective support bars 132, 134, 135, 136, 138, and 139 and also secured to the longitudinal support beam 118. Divider 144 is shown in FIG. 2a. The dividers 144 and 148 145, are preferably triangular shaped with a triangular opening in the center. The dividers 142, 145, 146, and 149 are preferably rectangular dividers (as shown in FIGS. 2b, 6a, and 6b) or triangular dividers (as shown if FIG. 8). The dividers 142, 144, 145, 146, 148, and 149 separate the batteries 91–98 and provide further support for the removable battery tray 100. Although solid dividers could be used, the triangular shaped dividers 144 and 148 are preferred since they weigh less while still providing substantial support for the removable battery tray 100 and the battery set 90. A rear bracket 160 is shown on each side of the removable battery tray 100 to hold rear batteries 94 and 98 in position.

The removable battery tray 100 includes battery hold down brackets 11 located on each side of the battery tray 100 to secure the batteries 91–98 in the tray. In FIG. 2a, only one battery hold down bracket 11 is shown for securing batteries 91–94. A similar battery hold down bracket 11 on the opposing side of the removable battery tray 100 secures batteries 95–98. In a preferred embodiment, both ends of each battery hold down bracket 11 are secured to the removable battery tray 100 by a J-bolt 7. The J-bolt 7 ideally is secured to the battery hold down bracket 11 with a flat washer 19 and a nut 18. The J-bolt 7 fastens around tray bracket 4 attached to the removable battery tray 100.

In an alternate means of attaching the battery hold down bracket 11 to the removable battery tray 100, one end of the battery hold down bracket 11 can be attached to the removable battery tray 100 by the J-bolt combination described above and the other end of the battery hold down bracket 11 can be fastened to the removable battery tray 100 by a hinge (not shown) thus allowing easy access to the batteries 91–98 without needing to disconnect both ends of the battery hold down bracket 11.

One skilled in the art will recognize that there are many other ways to secure the batteries 91–98 to the removable battery tray 100 within the scope of the present invention.

Figure 7:
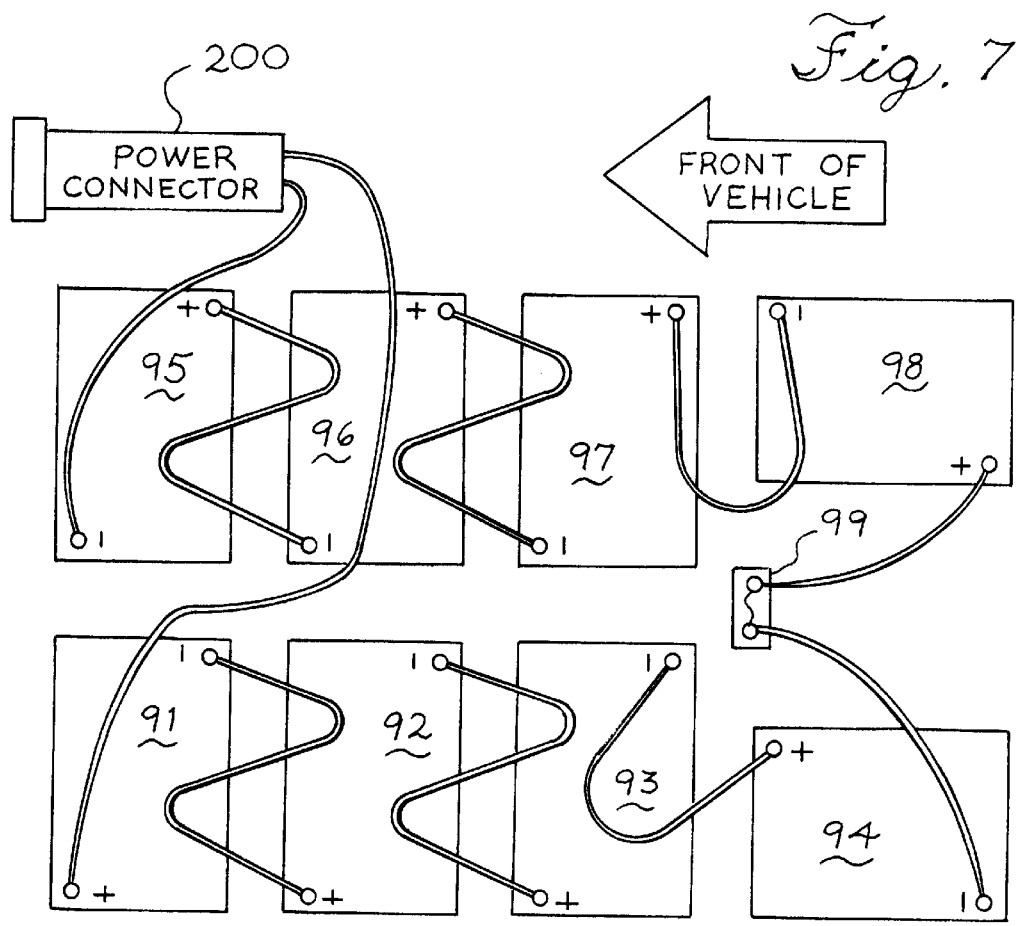
FIG. 7 is an overhead view of one embodiment of the battery and cable configuration in the present invention.

The batteries 91–98 are electrically connected to each other in series by wires 212 as shown in FIG. 7. The positive terminal of battery 91 and the negative terminal of battery 95 are connected to an electrical power connector 200 such as a plug. A fuse 99 is shown connected in series between batteries 94 and 98 to protect the battery system 90. When the electrical power connector 200 is connected to a power source, such as an electrical outlet, a generator or other acceptable device, each of the batteries 91–98 receives power and is charged. Therefore, removal of each of the batteries 91–98 individually from the tray 100 for recharging is not necessary.

When in place on the mower 10, the removable battery tray 100 is secured to the frame of the mower 110 by a lock system having a frame portion and a tray portion. In FIG. 3a, the frame portion is a vertical frame pin 8 welded to one opposing side of each support member 62 and 64 of mower frame 110. When the removable battery tray 100 is placed on the mower frame 110, the vertical frame pins 8 protrude through the holes in the frame support brackets 117 (FIG. 2a). Frame support bracket 116 rests on support members 62 and 64. The removable battery tray 100 is secured to the mower frame 110 at frame support brackets 117 or tray portions, with a spring lock system 12 shown in more detail in FIGS. 8 and 9.

In FIG. 8, the frame support bracket with hole 117 attached to front frame member 40 has a vertical frame pin 8 passing through the hole. Horizontal cross pin 14 of spring lock system 12 passes through a horizontal opening in vertical frame pin 8 and has a spring metal clip 15 attached on opposing sides to secure the spring lock system 12 in place. FIG. 8 also shows the J-bolt 7 mechanism previously described passing through tray bracket 4 for securing the battery hold down brackets 11. The battery hold down bracket 11 shown in FIG. 8 secures batteries 91–94. Triangular dividers 149 and 148 are shown separating the batteries 91 from 92 and 92 from 93.

FIG. 9 shows an overhead view of the spring lock system 12. Vertical frame pin 8 is shown in phantom with horizontal cross pin 14 passing through the horizontal opening in vertical frame pin 8. Spring metal clip 15 as described above is attached at opposing ends to each end of the horizontal cross pin 14 to secure the spring lock system 12 in place. One spring lock system 12 is positioned on each lateral side of main frame tube 60 (FIG. 3a) in corresponding relationship with the frame support bracket with a hole 117. This arrangement allows for increased lateral support without requiring all four frame support members to have a vertical frame pin 8 and a spring lock system 12.

FIG. 3a shows the mower frame 110 of the electric mower 10 of the present invention. The mower frame 110 is generally fork shaped, and has two short, L-shaped (or curved), prong-like elements 111 and 112 extending from left and right transverse members 109 and 113 respectively. The left and right transverse members 109 and 113 are attached at their inside ends to main frame tube 60. The front two drive wheels 24 and 25 are connected to a drive axle (not shown) which is mounted between the prong-like elements 111 and 112 The front ends of the prong-like elements 111 and 112 are connected to each other by forward cross member 114. The two front cutting units or reels 27 and 28 (shown in FIG. 1) are mounted to this forward cross member 114. The main frame tube 60 extends for most of the length of the mower frame 110. The mower frame 110 also includes a seat support extension 119 for the operator's seat 9 (FIG. 1). Seat support extension 119 extends forward from the main frame tube 60 at a point where the main frame tube 60 passes between left and right transverse members 109 and 113.

The removable battery tray 100 is designed to fit over the main frame tube 60 of the mower frame 110, shown in FIG. 3a. Longitudinal support beam 118 of the battery tray 100 described above, has an upside down "U" 105 shaped cross section that fits the width of the main frame tube 60 of the mower 10. The upside down "U" 105 extends the length of the removable battery tray 100. The removable battery tray 100, therefore, is saddle shaped: batteries 91–94 are placed on one side of the longitudinal support beam 118, and batteries 95–98 are placed on the other side of the longitudinal support beam 118. When the removable battery tray 100 is in place on the frame 110, four batteries 91, 92, 93, and 94 are loaded on one side of the main frame tube 60, and four batteries 95, 96, 97, and 98 are loaded on the other side of the main frame tube 60.

Other embodiments of the removable battery tray 100 are possible if a different shaped mower frame 110 is used. For example, an open center mower frame, known in the prior art, may have a removable battery tray that nests inside the open center frame structure. One skilled in the art will recognize that depending on the structure of the mower frame, many other embodiments are also possible while still remaining within the scope of the present invention.

Figure 4A:
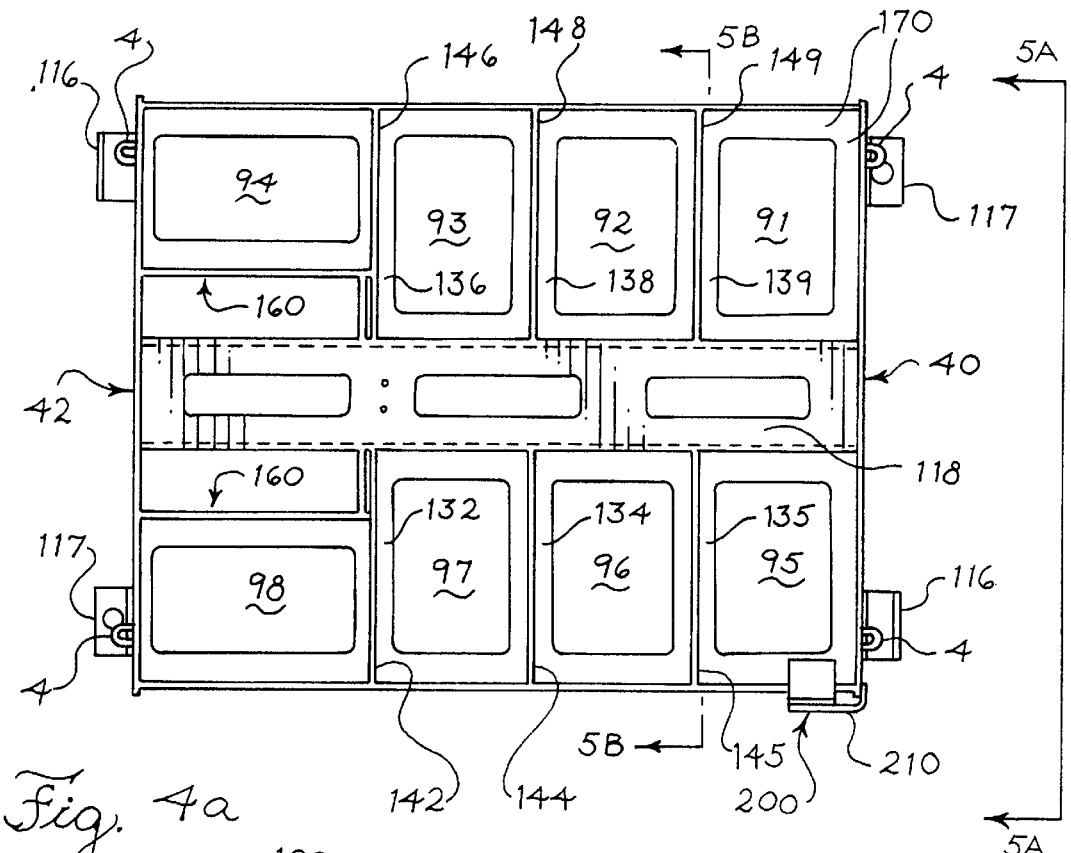
FIG. 4a is an overhead view of a first embodiment of the removable battery tray.

FIG. 4a is an overhead view of the removable battery tray 100 of the first embodiment of the invention. In FIG. 4a the support bars 132, 134, 135, 136, 138, and 139 are shown positioned in perpendicular relationship to the longitudinal support beam 118, and rear brackets 160 are located between the rear most support bars 132 and 136 and the rear frame member 42. From the positions of the support bars 132, 134, 135, 136, 138, and 139 the positions of the eight batteries 91–98 of the battery set 90 is shown. Longitudinal support beam 118, running from front frame member 40 to rear frame member 42, separates the support bars 132, 134, and 135 from the support bars 136, 137, and 139 located on the opposing side. The frame support brackets 116 and 117 are positioned on laterally opposing external sides of both front and rear frame members 40 and 42. Tray bracket 4 for engaging J-bolt 7 (FIGS. 2a and 2b) is located on both ends of both the front frame member 40 and the rear frame member 42. The electrical power connector 200 is shown supported by electrical power connector mount bracket 210.

Figure 5A:
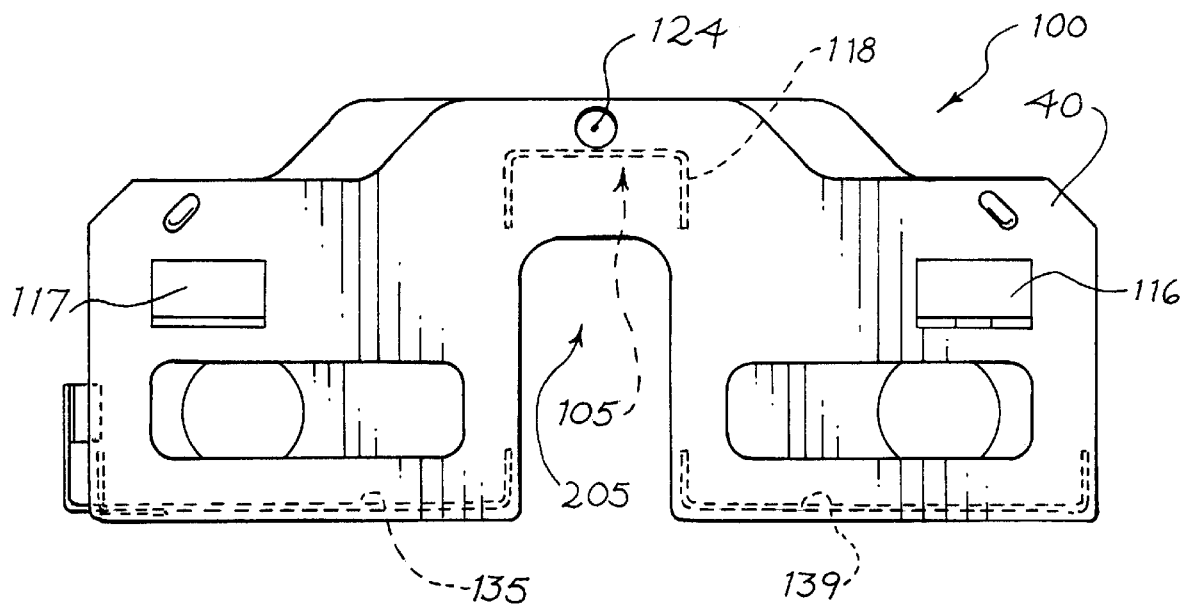

FIG. 5a is a front elevation view of the removable battery tray 100 as seen from line A—A in FIG. 4a. The positioning of the top of support beam 118 on the inside of front frame member 40 of the removable battery tray 100 is shown in phantom. Profiles of two support bars 135 and 139 are also shown in phantom; support bars 134 and 132 are positioned consecutively behind 135, and support bars 138 and 136 are positioned consecutively behind 139 and further towards the rear frame member 42. The upside down "U" shaped cut-out portion 205 of front frame member 40 corresponds to upside down "U" shaped cross section 105 of support beam 118 and main frame tube 60 of the mower frame 110. Frame support bracket 116 and frame support bracket with a hole 117 are located at laterally opposing external sides of front frame member 40. Hole 126 in front frame member 40 engages a hoist 115 or other appropriate mechanism to aid in removal of the removable battery tray 100 from the mower 10 or to replace the removable battery tray 100 on the mower 10.

FIG. 6a is a front elevation view of the removable battery tray 100 as seen from line B—B in FIG. 4a. Rear frame member 42 with holes 122 and 124 are shown as well as triangular dividers 146 and 148. The triangular dividers 144 and 148 are attached to corresponding support bars 134 and 138 which are (not shown) integral to the bottom battery support member 170.

The second embodiment of the removable battery tray 100 is shown in FIGS. 2b, 3b, 4b, 5b, and 6b. This embodiment of the removable battery tray 100 is similar to the first embodiment shown in FIGS. 2a, 3a, 4a, 5a, and 6a except for two differences: (1) the second embodiment employs a different structure for fastening the removable battery tray 100 to the mower frame 110 and (2)the second embodiment provides a different structure for removing the removable battery tray 100 from the mower 10.

Turning now to the alternate fastening structure shown in FIG. 2b, a hook clamp 6 is secured to the external side of rear frame member 42 of the removable battery tray 100 by a screw 22. A toggle clamp 5 having a "U" joint is secured by screw 20 in corresponding relationship on horizontal support beam 64 of mower frame 110 (FIG. 3b). When the removable battery tray 100 is placed on the frame 110, the "U" joint on the toggle clamp 5 is secured to the hook clamp 6. Similarly, another hook clamp 6 is secured to by screw 22 to support bar 62 of the mower frame 110 (FIG. 3b). Another toggle clamp 5 having a "U" joint is secured by a second screw 20 to a corresponding position on the external side of front frame member 40 of the removable battery tray 100. When the removable battery tray 100 is placed on the frame 110, the "U" joint on the toggle clamp 5 is secured to the hook clamp 6 as described before. These two laterally opposing means for securing the removable battery tray 100 to the mower frame 110 provide support to the removable battery tray 110 when installed on the mower frame 110. Of course, other means for securing the removable battery tray 100 to the frame 110 of the mower 10 including a frame portion and tray portion are possible while still remaining within the scope of the current invention.

Turning now to the alternate structure for removing the removable battery tray 100 from the mower 10, FIG. 2b, shows the removable battery tray 100 with handles 122, 124, and 126 instead of the holes in FIG. 2a. In this embodiment, the three handles 122, 124, and 126, are welded to the removable battery tray 100, one 126 on the external side of the front frame member 40, and two 122 and 124 on the external side of the rear frame member 42. These handles 122, 124, and 126 attach to the hoist 115 (shown in FIG. 2a) or other means to allow easy removal of a used set of batteries 90 loaded in battery tray 100 and installation of a charged battery set 90 in another battery tray 100. The handles 122, 124 and 126 along with the hooks 123, 125, and 127 comprise a means for removing the battery tray 100 from the mower frame 110 and a means for positioning the battery tray 100 on the mower frame 110. One skilled in the art will recognize, however, that there are many other equivalent means for removing and means for positioning while still remaining within the scope of the invention.

The system of holes 122, 124, and 126 described in FIG. 2a is preferred from a manufacturing standpoint over the handles described in FIG. 2b, however, since the holes can be cut directly into the removable battery tray 100 thus eliminating the need for welding hooks 122, 124, and 126 of FIG. 2b to the removable battery tray 100.

The embodiment shown in FIG. 3b is similar to that shown in FIG. 3a except that the welded vertical frame pin 8 and spring lock 12 system is replaced by the clamp 6 and screw 20 system corresponding with the removable battery tray 100 of FIG. 2b. Specifically, toggle clamp 5 having a "U" joint is secured by screw 20 to one lateral side of horizontal support beam 64 of mower frame 110. Hook clamp 6 is secured by screw 22 to the opposing lateral side of horizontal support beam 62 of mower frame 110. Both toggle clamp 5 having a "U" joint and hook clamp 6 interact with the removable battery tray 110 as described with respect to FIG. 2b.

As discussed with respect to FIGS. 2a and 2b, the embodiment in FIG. 3a is presently preferred over that shown in FIG. 3b since the spring lock system 12 of FIGS. 2a and 3a provides for move efficient removal and replacement of the removable battery tray 100.

Figure 4B:
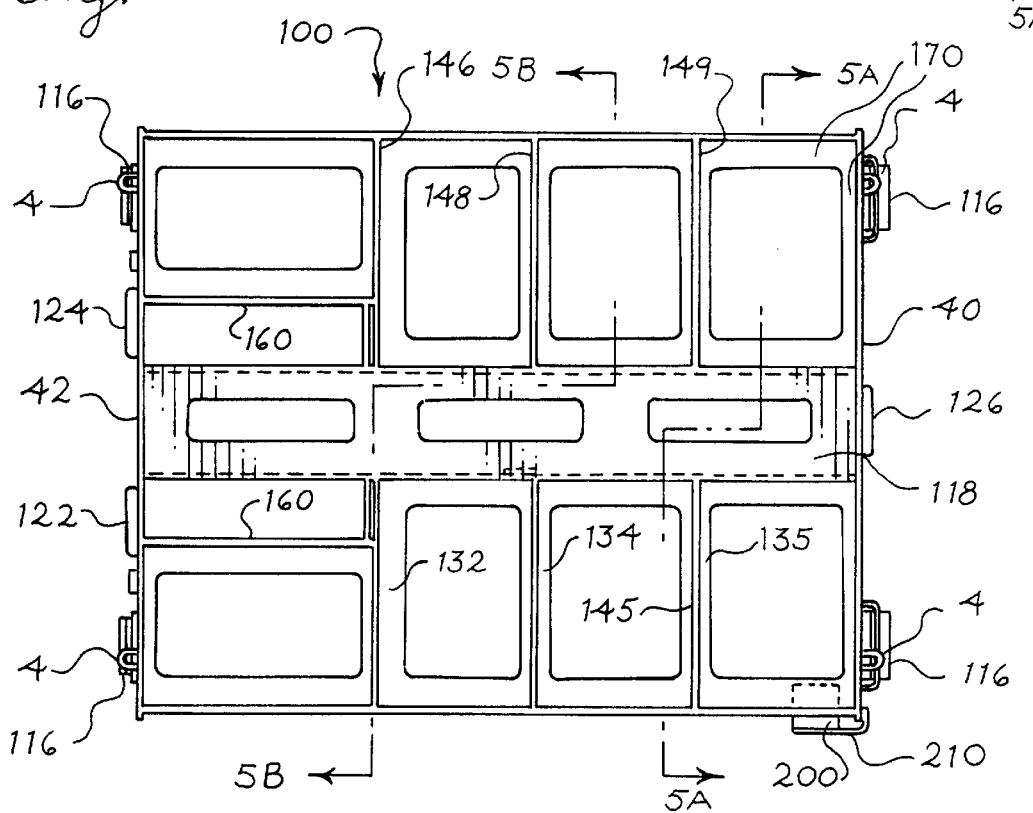
FIG. 4b is an overhead view of a second embodiment of the removable battery tray.

FIG. 4b is similar to FIG. 4a, however, FIG. 4b corresponds to the embodiment shown in FIGS. 2b and 3b. The welded hooks 122, 124 and 126 are used for connecting the removable battery tray 100 to a hoist 115 as seen in FIG. 2b. And, in the embodiment shown in FIG. 4b, the frame support brackets 116 do not have holes since the hook clamp 6 and screw 20 system described above is used to secure the removable battery tray 100 to the mower frame 110.

As discussed above with respect to FIGS. 2a and 2b, the battery set 90 is arranged in a manner to fit the mower frame 110 of the present invention. A mower having a different mower frame could have a different battery arrangement to fit the shape of the mower frame, and therefore, a differently shaped removable battery tray. One skilled in the art will recognize that any of these variations falls within the scope of the removable battery tray invention. As discussed above, an open center mower frame on the mower would require a different removable battery tray arrangement than that shown in FIGS. 4a and 4b. An open center frame mower might require a removable battery tray having its support around the outside of the frame instead of horizontally down the center. In such an embodiment, the batteries would rest in the tray, and the tray would attach at its edges to the open center frame of the mower.

Figure 5B:
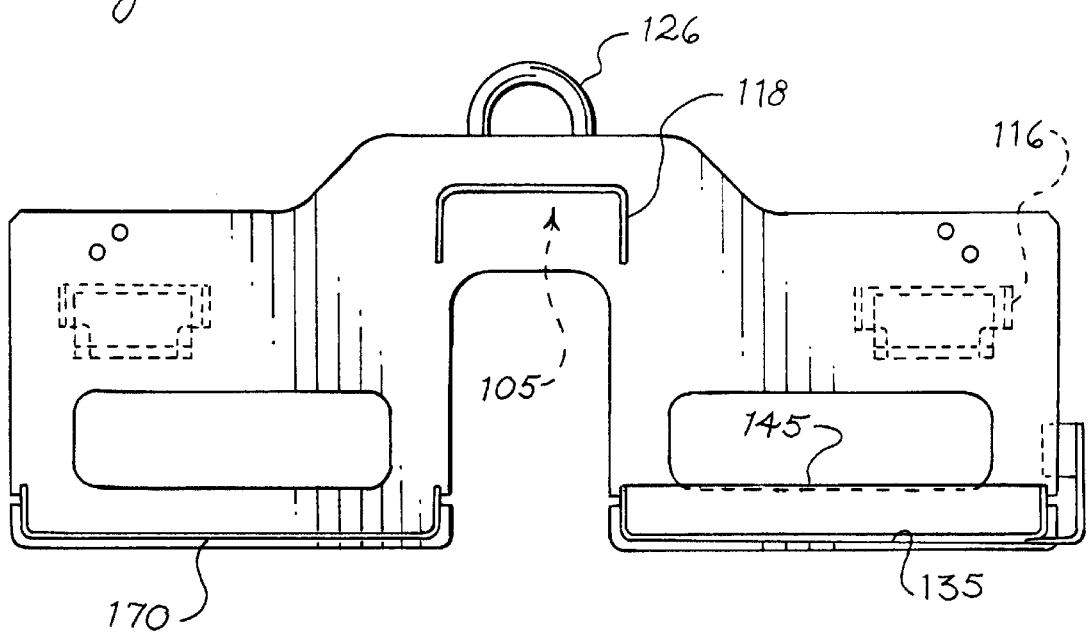
FIG. 5b shows a second embodiment of the removable battery tray along line A—A of FIG. 4b.

FIG. 5b is a front elevation view of the removable battery tray 100 of FIG. 4b looking towards the front of the removable battery tray 100 along line A—A. Hook 126 and frame support brackets 116 are attached to the external side of front frame member 40. Frame support brackets 116 are shown in phantom. Upside down "U" shaped cross section 105 corresponds to support beam 118 and main frame tube 60. Support bar 135 is on the right side of FIG. 5b; the left side shows the integrated bottom battery support member 170.

In FIG. 6b is a front elevation view of the removable battery tray 100 as seen from line B—B of FIG. 4b. The two back handles 122 and 124 welded to the external side of rear frame member 42 of the removable battery tray 100 are visible as well as the triangular divider 148. Divider 146 is shown in phantom. Longitudinal support beam 118 attaches to rear frame member 42 at upside down U-shaped cross section 105. Rear brackets 160 located on either side of the longitudinal support beam 118 and attached to rear frame member 42, help hold the rear batteries 94 or 98 in position. Frame support brackets 116, shown in phantom, are attached to the rear frame member 42 and the bottom battery support member is shown at 170.

In the foregoing specification, the invention has been described with reference to specific embodiments thereof. It will, however, be evident that various modifications and changes may be made thereto without departing from the broader spirit and scope of the invention as set forth in the appended claims.

For example, features of the first embodiment disclosed can be incorporated into the second embodiment. The spring lock system of the first embodiment would work equally well on the removable battery tray of the second embodiment having the welded hooks. Likewise, the welded hooks of the second embodiment could be replaced by the holes of the first embodiment while keeping the hook clamp means for securing the removable battery tray to the mower frame.

Additionally, as discussed in detail above, an open center mower frame would require a different removable battery tray arrangement to fit that frame. Furthermore, a removable battery tray can be designed to fit an open center mower frame with horizontal cross beams for frame support. Such a removable battery tray would rest on the horizontal cross beams of the removable battery tray. Other types of frames are envisioned where the batteries in the removable battery tray are arranged like a cube, with four batteries arranged in a block and four batteries arranged in another block and located above the first four. These and other arrangements for a removable battery tray for an electrically powered mower fall within the scope of the present invention.

Other techniques for securing the removable battery tray to the mower frame are included within the scope of the present invention as are other means of removing the removable battery tray from the mower frame. The specification and drawings are, accordingly, to be regarded in an illustrative rather than a restrictive manner.

We claim:

1. An electric mower comprising:

a frame;

at least one cutting unit secured to the frame;

a plurality of wheels connected to the frame wherein at least one of the plurality of wheels is a drive wheel;

an electric drive motor operably connected to the drive wheel, the electric drive motor powered by a battery set;

a removable battery tray configured to be positioned on the frame and to hold the battery set;

a front portion and a rear portion;

a support beam having a first end and a second end, the first end of the support beam being connected to the front portion of the removable battery tray, and the second end of the support beam being connected to the rear portion of the removable battery tray;

a plurality of bars positioned in perpendicular arrangement with respect to the support beam, the plurality of bars to provide support for the removable battery tray; and dividers secured to the bars to separate one battery from another in the removable battery tray.

2. The electric mower of claim 1 wherein the removable battery tray further comprises at least one bracket for securing the plurality of batteries in the removable battery tray.

3. The electric mower of claim 1 wherein the removable battery tray further comprises:

a first handle located on the front portion; and a second handle located on the rear portion, whereby the first handle and the second handle aid in removal of the removable battery tray.

4. The electric mower of claim 1 wherein the front portion further comprises a first opening, and the rear portion further comprises a second opening, the first and second openings to aid in removal of the removable battery tray.

5. The electric mower of claim 1 further comprising an electrical power connector configured to be electrically connected to the battery set.

6. An electric mower comprising;

a frame;

a plurality of cutting units secured to the frame;

a plurality of wheels connected to the frame wherein at least one of the plurality of wheels is a drive wheel;

an electric drive motor operably connected to the drive wheel, the electric drive motor powered by a battery set;

a removable battery tray configured to be positioned on the frame and to hold the battery set;

a front portion and a rear portion;

a support beam having a first end and a second end, the first end of the support beam being connected to the front portion of the removable battery tray, and the second end of the support beam being connected to the rear portion of the removable battery tray;

a plurality of bars positioned in perpendicular arrangement with respect to the support beam, the plurality of bars to provide support for the removable battery tray;

positions for the plurality of batteries in the battery set;

at least one bracket for securing the plurality of batteries in the battery set; and dividers secured to the bars to separate one battery from another in the removable battery tray.

7. The electric mower of claim 6 further comprising a lock system to secure the removable battery tray to the frame, wherein the lock system includes a frame portion mounted to the frame and a tray portion mounted to the removable battery tray, and the frame portion engages the tray portion allowing the lock system to secure the removable battery tray to the frame.

8. The electric mower of claim 6 wherein the removable battery tray is attached to the frame with a hook clamp and a screw.

9. An electric mower comprising:

a frame;

at least one cutting unit secured to the frame;

a plurality of wheels connected to the frame wherein at least one of the plurality of wheels is a drive wheel;

an electric drive motor operably connected to the drive wheel, the electric drive motor powered by a battery set;

a removable battery tray configured to be positioned on the frame and to hold the battery set; and the electric mower having a spring lock system to secure the removable battery tray to the frame comprising:

a first pin affixed to the frame; and a bracket attached to the removable battery tray, the bracket having an opening for receiving the first pin when the removable battery tray is loaded on the frame.

10. The electric mower of claim 9 wherein the first pin includes a transverse opening and further comprising a second pin configured to be placed through the opening to secure the first pin in position through the bracket.

11. The electric mower of claim 10 wherein the second pin has a front end and a back end, the front end and the back end extend on either side of the first pin and wherein the second pin includes a strip of flexible material having a first end and a second end, the first end of the flexible material attaches to the front end of the second pin and the second end of the flexible material attaches to the back end of the second pin.

12. A removable battery tray for use in an electrically powered mower comprising:

a front member and a rear member;

a support beam having a first end and a second end, the first end attached to a central location of the front member, and the second end attached to a central location of the rear member;

a plurality of battery positions configured in perpendicular arrangement on either side of the support beam, each battery position including a bar located perpendicularly to the support beam and positioned to provide a support upon which the battery rests in the battery position.

13. The removable battery tray of claim 12 further comprising a divider positioned perpendicularly to the support beam and attached to the support beam to provide further bracing for the removable battery tray.

14. The removable battery tray of claim 12 further comprising a means for removing the removable battery tray from a mower frame.

15. The removable battery tray of claim 12 further comprising a means for positioning the removable battery tray on a mower frame.

16. The removable battery tray of claim 12 further comprising a plug positioned for electrical connection with a battery located in the battery positions.

17. The removable battery tray of claim 16 wherein the plug is electrically connected to a power source to provide power to the battery.

18. An electric mower comprising:

a frame;

at least one cutting unit secured to the frame;

a plurality of wheels connected to the frame wherein at least one of the plurality of wheels is a drive wheel;

an electric drive motor operably connected to the drive wheel, the electric drive motor powered by a battery set; and a removable battery tray configured to be positioned on the frame and to hold the battery set, the battery tray having:

a front portion and a rear portion;

a support beam having a first end and a second end, the first end of the support beam being connected to the front portion of the removable battery tray, and the second end of the support beam being connected to the rear portion of the removable battery tray; and a plurality of bars positioned in perpendicular arrangement with respect to the support beam and defining a plurality of battery positions, the bars each providing a support upon which a battery rests in the respective battery position.

* * * * *